US012669477B2

(12) United States Patent
Soejima

(10) Patent No.: US 12,669,477 B2
(45) Date of Patent: Jun. 30, 2026

(54) TAPPING INSPECTION SYSTEM AND TAPPING INSPECTION METHOD

(71) Applicant: SUBARU CORPORATION, Tokyo (JP)

(72) Inventor: Hideki Soejima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 301 days.

(21) Appl. No.: 18/480,216

(22) Filed: Oct. 3, 2023

(65) Prior Publication Data

US 2024/0125740 A1     Apr. 18, 2024

(30) Foreign Application Priority Data

Oct. 13, 2022     (JP) ................................. 2022-164422

(51) Int. Cl.
| | |
|---|---|
| *G01N 29/04* | (2006.01) |
| *G01N 3/34* | (2006.01) |
| *G01P 15/18* | (2013.01) |
| *G02B 27/01* | (2006.01) |

(52) U.S. Cl.
CPC ............. *G01N 29/045* (2013.01); *G01N 3/34* (2013.01); *G01P 15/18* (2013.01); *G02B 27/0172* (2013.01); *G01N 2291/2694* (2013.01); *G02B 2027/0141* (2013.01)

(58) Field of Classification Search
CPC ............................... G01N 3/34; G01N 29/045
See application file for complete search history.

(56) References Cited

U.S. PATENT DOCUMENTS

| | | | |
|---|---|---|---|
| 6,748,791 B1 * | 6/2004 | Georgeson ......... | G01N 29/4427 |
| | | | 73/12.06 |
| 11,579,059 B2 | 2/2023 | Miyake et al. | |
| 2005/0011249 A1 * | 1/2005 | Mahaffey ................ | G01M 7/08 |
| | | | 702/81 |
| 2014/0188473 A1 | 7/2014 | Lambdin et al. | |
| 2021/0223211 A1 | 7/2021 | Fujii et al. | |
| | | (Continued) | |

FOREIGN PATENT DOCUMENTS

| | | | | |
|---|---|---|---|---|
| CN | 102016 | * | 10/2016 | ........... G01L 5/0052 |
| CN | 109507288 A | | 3/2019 | |
| | | (Continued) | | |

OTHER PUBLICATIONS

English Translation of CN-106053004-A (Year: 2016).*

(Continued)

*Primary Examiner* — Alexander A Mercado
(74) *Attorney, Agent, or Firm* — Rimon P.C.

(57) ABSTRACT

A tapping inspection system includes a hand-held hammer, a display, a device, a position detection unit and a storage. The hammer is for tapping an inspection portion. The display is configured to display a target position to be tapped with the hammer. The target position is superimposed on the inspection portion. The device is for collecting sound generated when the inspection portion is tapped with the hammer. The position detection unit is configured to detect a position in the inspection portion tapped with the hammer. The storage is configured to store an inspection record created by relating the sound collected by the device with the position detected by the position detection unit.

15 Claims, 9 Drawing Sheets

(56) References Cited

U.S. PATENT DOCUMENTS

| | | | | |
|---|---|---|---|---|
| 2021/0231515 A1* | 7/2021 | Song | | G06N 5/04 |
| 2023/0093886 A1* | 3/2023 | Kikuchi | | G01N 3/303 |
| | | | | 73/12.11 |
| 2023/0106629 A1* | 4/2023 | Kikuchi | | G01C 15/002 |
| | | | | 356/72 |
| 2025/0072875 A1* | 3/2025 | Schwab | | A61B 5/395 |

FOREIGN PATENT DOCUMENTS

| | | | | |
|---|---|---|---|---|
| JP | H10-300730 A | | | 11/1998 |
| JP | 2000-074889 A | | | 3/2000 |
| JP | 2014-134471 A | | | 7/2014 |
| JP | 2015-179050 A | | | 10/2015 |
| JP | 2018-179921 A | | | 11/2018 |
| JP | 2019-028009 A | | | 2/2019 |
| JP | 2019082402 A | * | | 5/2019 |
| JP | 2020-003240 A | | | 1/2020 |
| JP | 2021-018212 A | | | 2/2021 |
| JP | 2021-181967 A | | | 11/2021 |
| JP | 7142280 B2 | | | 9/2022 |
| WO | 2019/230687 A1 | | | 12/2019 |
| WO | 2020/021589 A1 | | | 1/2020 |

OTHER PUBLICATIONS

English Translation of WO 2020/021589 A1 (Year: 2020).*
English Translation of JP-2019082402-A (Year: 2019).*
Extended European Search Report dated on Mar. 7, 2024 issued in the corresponding European Patent Application No. 23203455.3.
Communication pursuant to Article 94(3) EPC dated Mar. 26, 2026, issued in corresponding European Patent Application 23203455.3.
Office Action received in corresponding Japanese Patent Application No. 2022-164422, dated Apr. 14, 2026.

* cited by examiner

DATA
PROCESSING
UNIT

A-A

49

43        48

B

TAPPING INSPECTION SYSTEM AND TAPPING INSPECTION METHOD

CROSS REFERENCES TO RELATED APPLICATIONS

This application is based upon and claims the benefit of priority from Japanese Patent Application No. 2022-164422, filed on Oct. 13, 2022; the entire contents of which are incorporated herein by reference.

FIELD

Implementations described herein relate generally to a tapping inspection system and a tapping inspection method.

BACKGROUND

A tapping inspection is known as an inspection method in which parts to be inspected are tapped with a hammer and the quality of an object to be inspected is determined based on generated taps (for example, refer to Japanese Patent Application Publication JP2015-179050A, International Publication WO2019/230687 and Japanese Patent Application Publication JP2020-003240A). In aircraft maintenance inspections, parts made of a fiber reinforced plastic (FRP), such as glass fiber reinforced plastic (GFRP) or carbon fiber reinforced plastic (CFRP), as well as helicopter parts are also subjected to tapping inspections.

Since an aircraft is large and mobile, a tapping inspection of the aircraft is carried out by having an operator, such as an inspector or a mechanic, move to the vicinity of an inspection portion. For example, when the inspection portion is high like a case where the inspection portion is in a main wing of a fixed-wing aircraft, the operator rides on a vehicle for work at height and moves to the vicinity of the inspection portion. Then, a tapping inspection is performed by the operator holding a hammer and hitting the inspection portion of the aircraft part with the hammer. Specifically, when an impact is applied to the inspection portion with the hammer, an impact sound is generated and thereby the operator can inspect the presence or absence of damage and the like based on the impact sound.

The conventional tapping inspection, which is manually performed by an operator, largely depends on the skill of the operator. Specifically, the skill of the operator is required not only to determine an appropriate tapping position with a hammer according to internal structure and the strength of the impact load by the hammer, but also to appropriately determine the inspection result based on the impact sound. That is, in a tapping inspection performed by an operator, both determination of inspection conditions and acquisition of inspection results depend on the skill of the operator.

Accordingly, an object of the present invention is to reduce skill dependency for each operator in a tapping inspection performed manually by an operator.

SUMMARY

In general, according to one implementation, a tapping inspection system includes a hand-held hammer, a display, a device, a position detection unit and a storage. The hammer is for tapping an inspection portion. The display is configured to display a target position to be tapped with the hammer. The target position is superimposed on the inspection portion. The device is for collecting sound generated when the inspection portion is tapped with the hammer. The position detection unit is configured to detect a position in the inspection portion tapped with the hammer. The storage is configured to store an inspection record created by relating the sound collected by the device with the position detected by the position detection unit.

Further, according to one implementation, a tapping inspection method includes performing tapping inspection of an aircraft using the above-mentioned tapping inspection system.

DETAILED DESCRIPTION

A tapping inspection system and a tapping inspection method according to implementations of the present invention will be described with reference to the accompanying drawings.

Configuration and Function of a Tapping Inspection System

Figure 1:
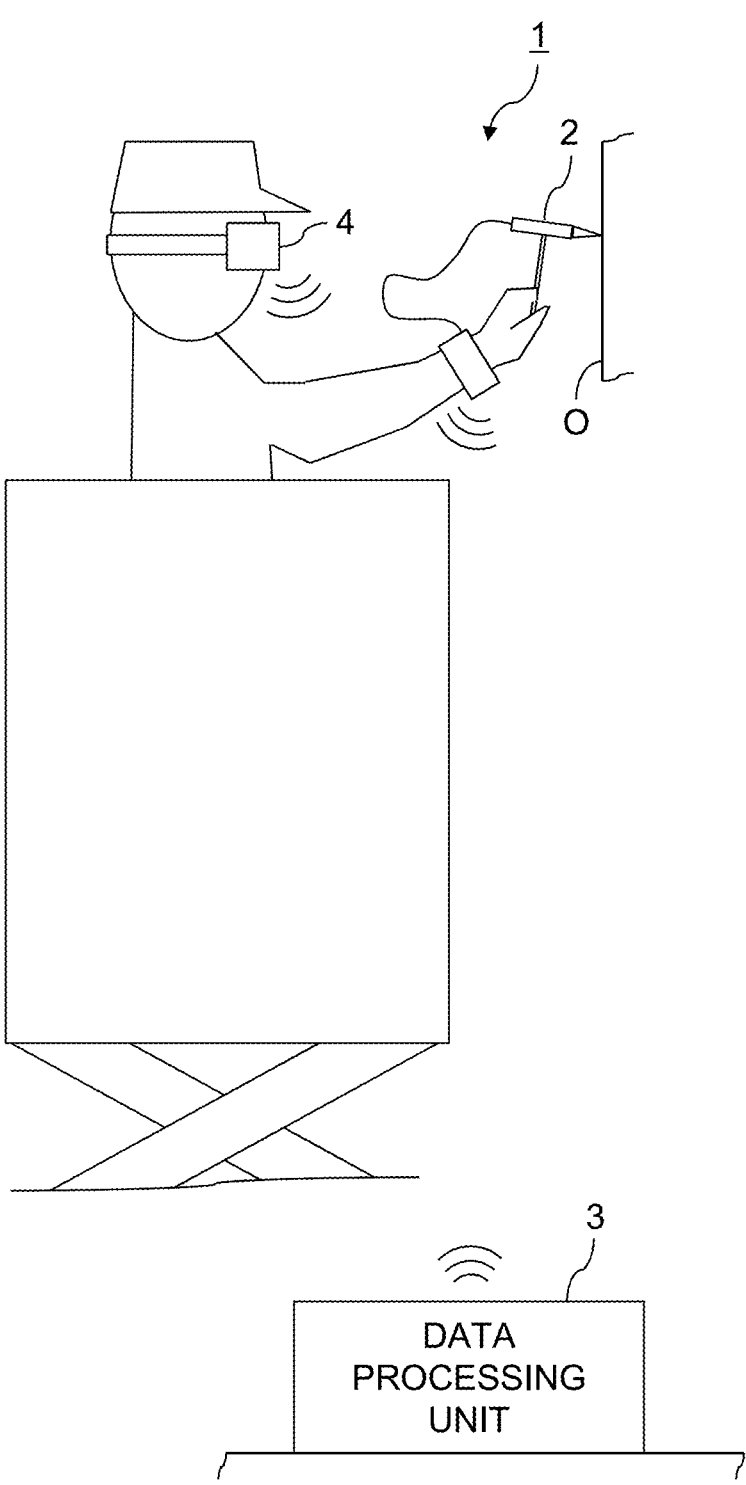
FIG. 1 shows a schematic configuration of a tapping inspection system according to an implementation of the present invention.

FIG. 1 shows a schematic configuration of a tapping inspection system according to an implementation of the present invention.

A tapping inspection system 1 is a system for manually performing a tapping inspection or tapping inspections on an inspection object O by an operator, such as an inspector or a mechanic. Accordingly, the tapping inspection system 1 has a hand-held hammer 2 for tapping an inspection portion of the inspection object O. In addition, the tapping inspection system 1 has a data processing unit 3 that wirelessly transmits and receives data to and from the hammer 2, as well as an HMD 4 for AR (augmented reality) or MR (mixed reality) that wirelessly transmits and receives data to and from the data processing unit 3. The HMD 4 may be called goggles.

When the inspection object O of the tapping inspections is a main wing or a fuselage of an aircraft, an operator may ride on a vehicle for work at height for carrying out the tapping inspections as exemplified in FIG. 1. Therefore, wireless communication between the data processing unit 3 and each of the hammer 2 and the HMD 4 as exemplified in FIG. 1 leads to an improvement in practicality although the communication may be performed through wired connections.

Figure 2:
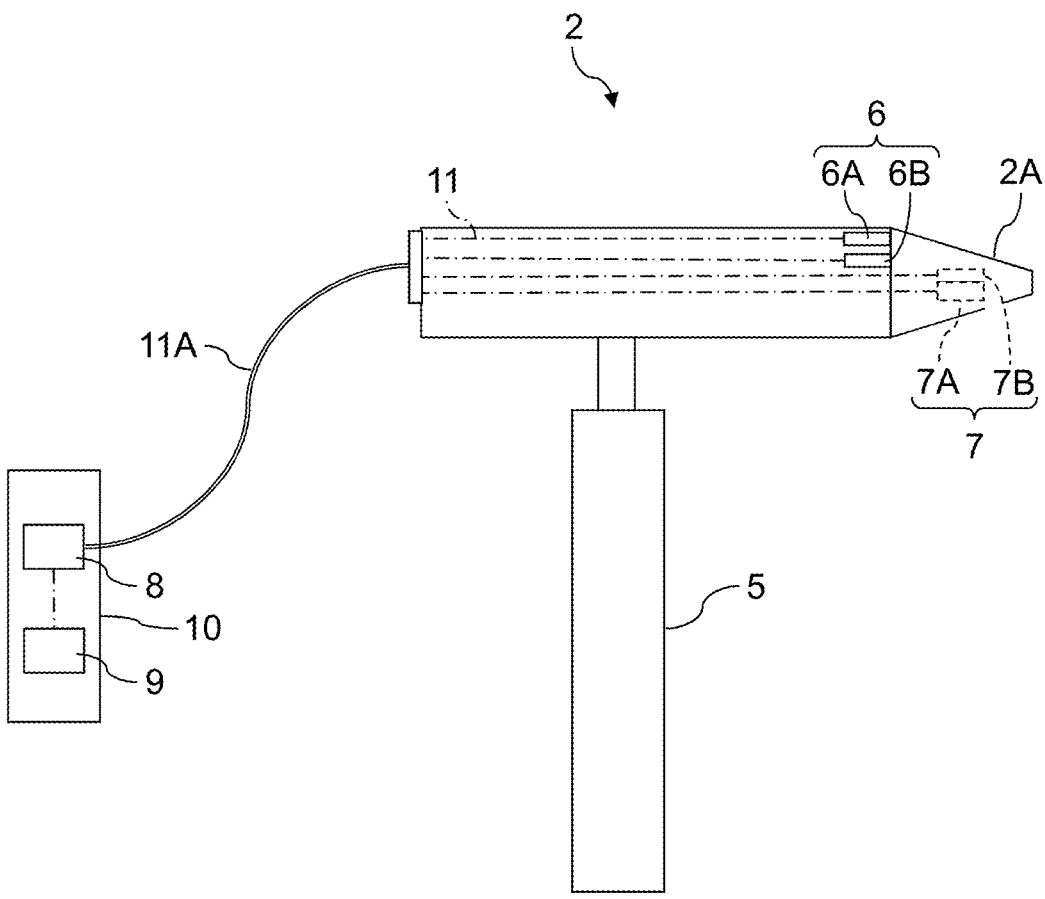
FIG. 2 shows an example of detailed structure of the hammer shown in FIG. 1.

FIG. 2 shows an example of detailed structure of the hammer 2 shown in FIG. 1.

The hammer 2 has a grip 5 to be held by an operator. In addition, the hammer 2 is equipped with at least one device 6, such as a microphone 6A, for detecting a sound wave, a sensor group 7, a memory 8, and a communication device 9. A wrist band 10 may be attached to the hammer 2, as required. In the example shown in FIG. 2, the wristband 10 attached to the hammer 2 is provided with the memory 8 and the communication device 9. Meanwhile, the at least one device 6, such as the microphone 6A, the sensor group 7, the memory 8 and the communication device 9 are coupled to each other with signal lines 11 including a detachable communication cable 11A. As a matter of course, at least one of the memory 8 and the communication device 9 may be directly mounted on the hammer 2.

The microphone 6A is the device 6 for collecting sound generated when an inspection portion is tapped by the hammer 2. Therefore, the microphone 6A can be disposed at a portion, at which the shock is reduced to some extent, near the tip of the hammer 2 where the generated sound can be easily collected, as shown in FIG. 2. Since the generated sound is not voice, the generated sound can also be collected in the form of a simple vibration waveform. Therefore, a vibration sensor, such as an ultrasonic sensor 6B or a piezoelectric element, may be used as the device 6 for collecting the generated sound without the microphone 6A or in addition to the microphone 6A.

When the ultrasonic sensor 6B is attached to the hammer 2 as exemplified in FIG. 2, it becomes possible to detect an ultrasonic wave generated when an inspection portion is tapped by the hammer 2. Therefore, even when the noise is large in the frequency band of 20 Hz to 20 kHz that an operator can hear, an ultrasonic vibration having characteristics representing a state of an inspection portion can be detected as long as the noise is small in the ultrasonic frequency band of not less than 20 kHz.

As a result, although intensity (amplitude) of an ultrasonic vibration is smaller than intensity of a sound wave having a frequency that can be heard by an operator, tapping inspections can be performed even in noisy environment as long as the detection sensitivity of an ultrasonic vibration is sufficiently secured. As a practical example of operation, when both the microphone 6A and the ultrasonic sensor 6B are attached to the hammer 2 as exemplified in FIG. 2, a shock sound having large amplitude can be collected by the microphone 6A in quiet environment with little noise while an ultrasonic vibration can be collected by the ultrasonic sensor 6B in noisy environment.

The sensor group 7 consists of sensors for detecting tapping conditions including an impact load and a tapping position when an inspection portion has been tapped with the hammer 2. Detecting a tapping position with the hammer

2 allows specifying an inspection portion. In addition, recording an impact load when an inspection portion has been tapped with the hammer 2 allows improving the precision of the tapping inspection since the influence of the difference in the impact load can be considered in addition to the generated sound.

An impact load when an inspection portion has been tapped with the hammer 2 can be measured by a strain sensor 7A as a change in strain amount of a hammer head 2A. Accordingly, it is appropriate to dispose the strain sensor 7A in the hammer head 2A whose strain amount is easily changed when an inspection portion has been tapped with the hammer 2. The strain sensor 7A may be not only a typical strain gauge but also an optical fiber sensor, such as an FBG (Fiber Bragg Grating) sensor or a PS (Phase-Shifted) FBG sensor.

On the other hand, a position in an inspection portion tapped with the hammer 2 can be detected by a position detector consisting of a position detection unit 7B configured to detect a position at the tip of the hammer head 2A. Therefore, the position detection unit 7B can also be attached to the hammer head 2A. Typical examples of the position detection unit 7B include an IMU (Inertial Measurement Unit). An IMU is a device for detecting a position of an object by detecting translational motion and rotational motion in orthogonal three axis directions. Translational motion is detected by acceleration sensors while rotational motion is detected by angular velocity (gyro) sensors. Therefore, the IMU can also be said to be a compound sensor composed of the acceleration sensors in the three axis directions and the angular velocity sensors in the three axis directions.

The tapping sound collected by the device 6, such as the microphone 6A, and the parameter values, representing tapping conditions, measured by the sensor group 7 can be output and recorded as digital data in the memory 8 via the signal lines 11. Generally, there are a plurality of positions to be tapped by the hammer 2, and a tapping inspection of each inspection portion is performed periodically. Therefore, it is appropriate to record a generated sound collected by a tapping inspection in association with not only a tapping position but also the date and time when the tapping position was tapped.

Therefore, a storage device with a built-in clock can be used as the memory 8. Thereby, information collected from the hammer 2 used by an operator can be recorded in the memory 8 as time-series data in association with the time. Specifically, a generated sound collected by the device 6, such as the microphone 6A, a shock load measured by the strain sensor 7A, and a tapping position detected by the position detection unit 7B can be related to the date and time, and then stored as inspection record data in the memory 8.

The communication device 9 is composed of an antenna, for wireless communication with the data processing unit 3, and a circuit board necessary for the wireless communication. Therefore, inspection record data stored in the memory 8 can be transferred to the data processing unit 3 from the communication device 9 coupled to the memory 8 via the signal line 11.

Figure 3:
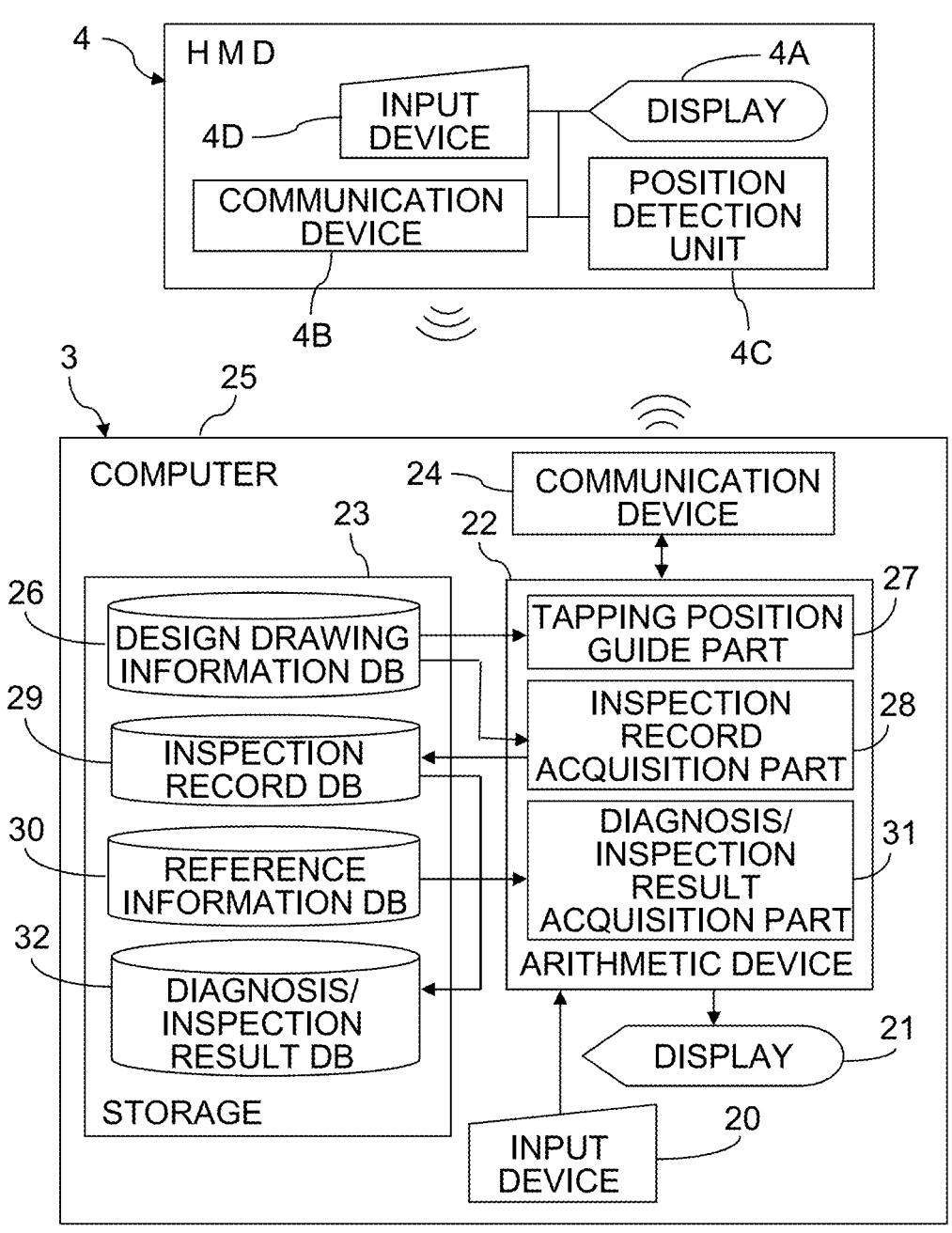
FIG. 3 is a functional block diagram of the data processing unit and the HMD (Head Mounted Display) shown in FIG. 1.

FIG. 3 is a functional block diagram of the data processing unit 3 and the HMD 4 shown in FIG. 1.

The data processing unit 3 includes an input device 20, a display 21, an arithmetic device 22, storage 23, and a communication device 24. That is, the data processing unit 3 can be consist of electronic circuitry, such as a computer 25, having the input device 20, the display 21, the arithmetic device 22, the storage 23, and the communication device 24, into which a data processing program is read. The communication device 24 is used for wireless communication with the communication device 9 on the hammer 2 side.

The data processing unit 3 has a function as an inspection record server that stores pieces of inspection record data of tapping inspections, and also has a guide function for displaying target positions to be tapped with the hammer 2 on the HMD 4. In addition, the data processing unit 3 can be provided with a function to analyze inspection record data of tapping inspections like determining the presence or absence of damage based on the inspection record data, as well as a function as an inspection result record server that stores analysis results as pieces of inspection result data.

As a specific example, the data processing program can be created so as to cause the data processing unit 3 consisting of the computer 25 to function as a design drawing information database 26, a tapping position guide part 27, an inspection record acquisition part 28, an inspection record database 29, a reference information database 30, a diagnosis/inspection result acquisition part 31, and a diagnosis/inspection result database 32.

On the other hand, the HMD 4 typically has a display 4A, a communication device 4B and a position detection unit 4C. The position detection unit 4C is a device for detecting a position and a field of view of the HMD 4. The position detection unit 4C can be composed of an IMU, an optical camera, or the like. As a matter of course, a type of the HMD 4 that uses radio signals, such as GPS (Global Positioning System) signals, for detecting a position and a field of view of the HMD 4 may be used. When the HMD 4 has an MR function, the HMD 4 also has an input device 4D, such as a microphone, so that information to be displayed on the display 4A can be operated and annotations can be recorded.

The design drawing information database 26 of the data processing unit 3 stores information associating target positions to be tapped with the hammer 2 with a design drawing or design drawings of portions or parts of the inspection object O of tapping inspections. Although each design drawing of the inspection object O is information for displaying a portion or a part as a 2D (two-dimensional) drawing, each design drawing of the inspection object O is associated with a spatial position, i.e., 3D (three-dimensional) position of the inspection object O.

In addition, information described in at least one work procedure manual referred to by an operator may be stored in the design drawing information database 26 as information accompanying at least one design drawing of the inspection object O. Note that, target positions of the inspection object O to be tapped with the hammer 2 correspond to a part of information described in at least one work procedure manual referred to by an operator.

The tapping position guide part 27 has a function to display target positions to be tapped with the hammer 2 on the HMD 4, based on at least one design drawing of the inspection object O and the target positions to be tapped with the hammer 2 stored in the design drawing information database 26, so that the target positions to be tapped with the hammer 2 may be superimposed on the inspection object O. The tapping position guide part 27 may display not only target positions to be tapped with the hammer 2 but also a design drawing on the HMD 4.

Note that, 2D design drawings of respective portions of the inspection object O, 3D design information, such as a 3D-CG (Computer Graphics) model or 3D-CAD (Computer-Aided Design) data, of the inspection object O, and target positions of tapping may be separately stored in the design drawing information database 26 while the tapping position guide part 27 may associate them with each other by spatial alignment.

Figure 4:
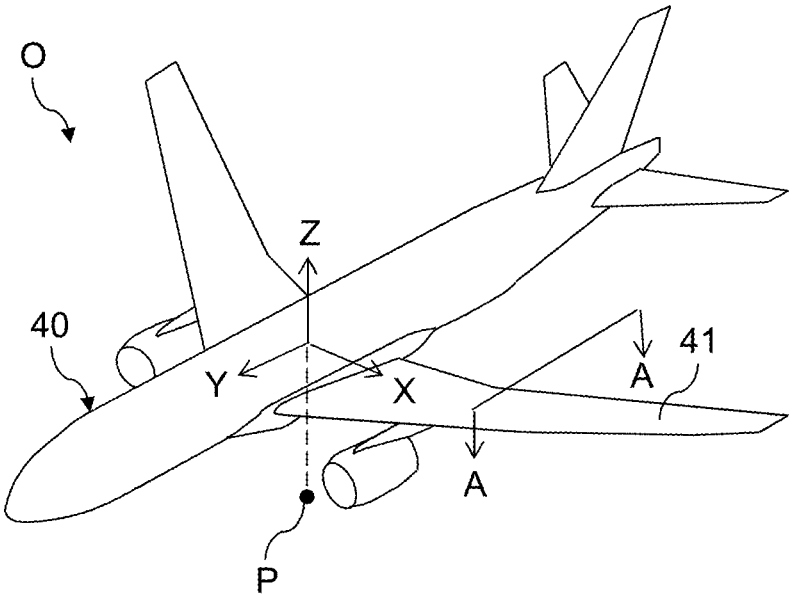
FIG. 4 is a perspective view showing an example of a fixed wing aircraft that is a candidate for the inspection object of tapping inspections with the tapping inspection system shown in FIG. 1.
Figure 5:
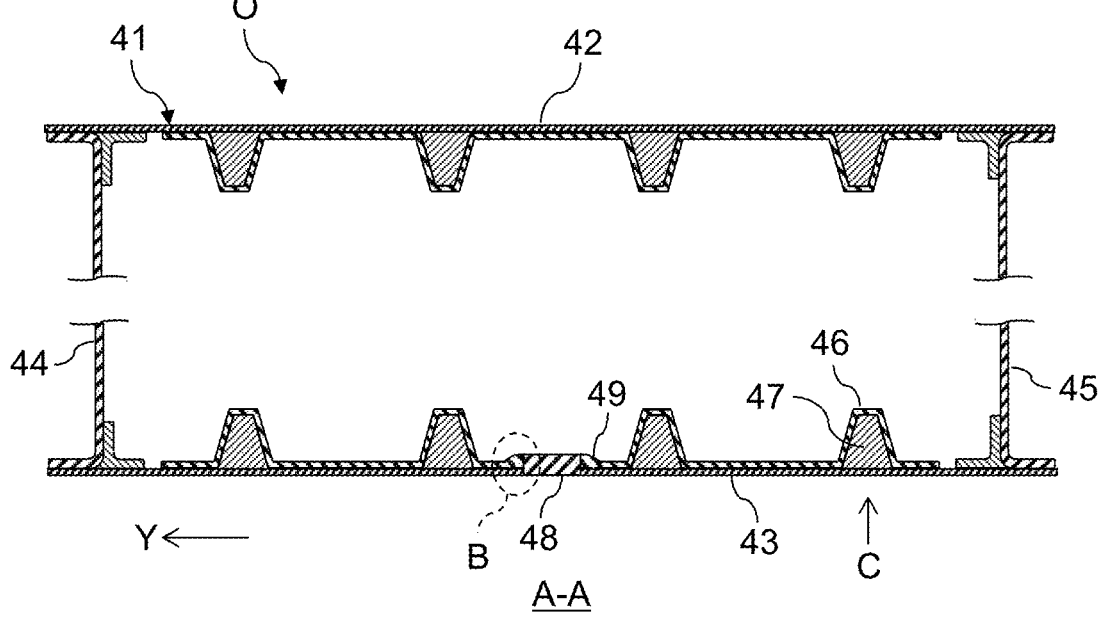
FIG. 5 is a partial cross sectional view near the position A-A of a main wing, included in the fixed wing aircraft exemplified in FIG. 4, showing a typical structural example which the main wing has.
Figure 6:
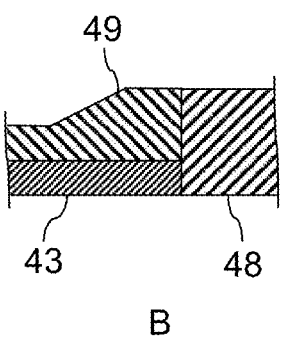
FIG. 6 is a partial enlarged view at the position B of the main wing shown in FIG. 5.

FIG. 4 is a perspective view showing an example of a fixed wing aircraft that is a candidate for the inspection object O of tapping inspections with the tapping inspection system 1 shown in FIG. 1. FIG. 5 is a partial cross sectional view near the position A-A of a main wing, included in the fixed wing aircraft exemplified in FIG. 4, showing a typical structural example which the main wing has. FIG. 6 is a partial enlarged view at the position B of the main wing shown in FIG. 5.

For example, a main wing 41 of a fixed wing aircraft 40 as exemplified in FIG. 4 may be an object of tapping inspections. The main wing 41 of the fixed wing aircraft 40 typically doubles as a fuel tank and has hollow box structure.

Specifically, an upper panel (upper skin) 42 is coupled to a lower panel (lower skin) 43 with a front spar 44 and a rear spar 45 as shown in FIG. 5, and then the space formed between them is used for filling aviation fuel. In addition, the upper panel 42 and the lower panel 43 are reinforced with reinforcement members, such as stringers, ribs and frames.

In the example shown in FIG. 5, each of the upper panel 42 and the lower panel 43 is reinforced by a corrugated stringer 46 having structure in which hat-shaped stringers each having a hat-shaped cross section are coupled to each other, and then the inside of each hat portion of the corrugated stringers 46 is filled with foam material 47. Each panel, such as the upper panel 42 or the lower panel 43, and each reinforcement member, such as the corrugated stringer 46, are made of a metal, such as aluminum, or an FRP, such as CFRP.

A typical panel of the main wing 41 has at least one access hole 48 for accessing the fuel tank. In many cases, a pad-up portion 49 having an increased plate thickness is formed around the cover of each access hole 48 as shown in FIG. 6 in order to secure the strength of the panel.

When the main wing 41 having such a complicated structure is hit with the hammer 2 from the outside, a tapping sound is generated depending on the material and structure. A possible defect, such as damage or a crack, changes the tapping sound. Therefore, whether the main wing 41 has a defect can be inspected by catching an abnormal tapping sound.

The complicated internal structure of the main wing 41 cannot be visually recognized from the outside of the main wing 41. That is, an operator of tapping inspections can see only the outside of the main wing 41. Therefore, the operator is required to tap the predetermined positions, instructed by a work procedure manual, with the hammer 2 without visually recognizing the internal structure.

Accordingly, target positions to be tapped with the hammer 2 can be displayed on the display 4A of the HMD 4 worn by the operator in accordance with an actual inspection portion of the inspection object O. In this case, the target positions to be tapped with the hammer 2 can be superimposed and displayed as AR on the inspection portion. That is, the HMD 4 can be made to function as a display for superimposing and displaying target positions to be tapped with the hammer 2 on an inspection portion.

Thereby, it becomes easy to tap appropriate positions with the hammer 2 without requiring the skill of an operator. That is, an operator can tap target positions marked through the HMD 4 with the hammer 2 without grasping distances from an actual land mark on the inspection object O and the like.

As described above, not only target positions to be tapped with the hammer 2 but also a design drawing of the inspection object O can be superimposed and displayed on the inspection object O. In that case, it is appropriate to display not only outlines representing an external appearance visible to an operator but also outlines representing internal structure invisible to the operator, on the design drawing of the inspection object O. This is because a sound generated by a tapping inspection changes depending on a thickness of a target position to be tapped with the hammer 2 and the presence or absence of a structural object disposed inside.

Figure 7:
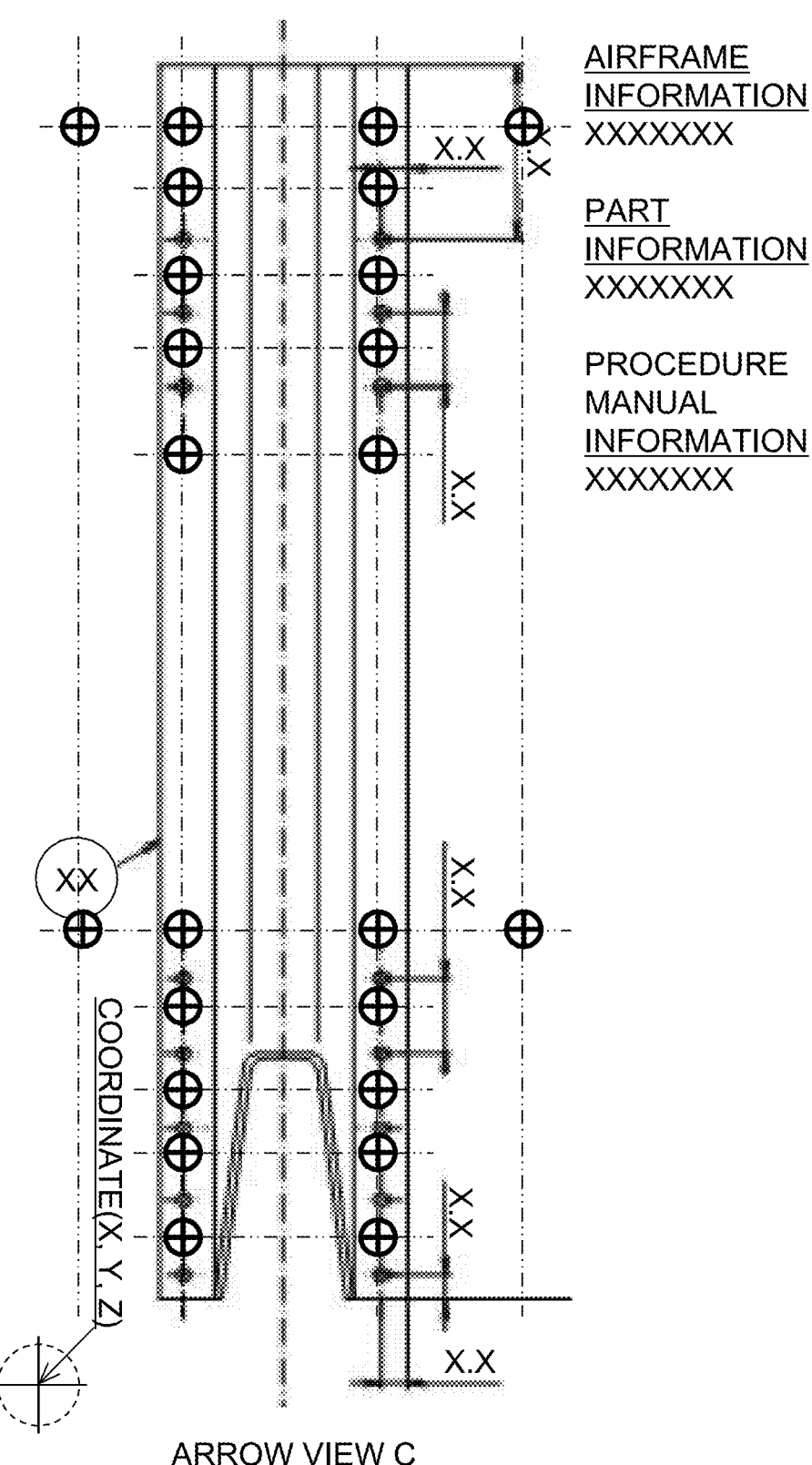
FIG. 7 shows an example of guide information superimposed on the main wing shown in FIG. 5 when an operator views the main wing from the arrow direction C.

FIG. 7 shows an example of guide information superimposed on the main wing 41 shown in FIG. 5 when an operator views the main wing 41 from the arrow direction C.

When an operator views the lower panel 43 of the main wing 41 shown in FIG. 5 from the arrow direction C, the operator looks up at the lower panel 43 from below the main wing 41. Specifically, although the operator cannot see the corrugated stringers 46 inside the main wing 41, the length direction of each hat portion of the corrugated stringers 46 is the up and down direction for the line of sight of the operator looking up.

Accordingly, a design drawing of the inspection object O showing the outlines of a hat portion of the corrugated stringer 46 can be displayed on the display 4A of the HMD 4 so that the length direction of the hat portion of the corrugated stringer 46 may be the up and down direction for the line of sight of the operator as exemplified in FIG. 7. That is, a design drawing of the inspection object O can be displayed on the display 4A of the HMD 4 according to the line of sight of the operator.

More specifically, the design drawing of the inspection object O showing the outlines of the hat portion of the corrugated stringer 46 can be displayed on the display 4A so that the outlines of the actual corrugated stringer 46 may overlap with the outlines of the corrugated stringer 46 shown in the design drawing. Thereby, the operator can grasp the position of the hat portion of the corrugated stringer 46 which is not actually visible.

In addition, target positions to be tapped with the hammer 2, which are targets of tapping inspections, are displayed on the display 4A of the HMD 4 as exemplified in FIG. 7. Specifically, the target positions to be tapped with the hammer 2 are marked and displayed with desired figures and colors on the display 4A of the HMD 4 so as to coincide with the actual tapping positions of the inspection object O. As a result, the operator can tap the markings by AR, which do not actually exist on the inspection object O, as the target positions with the hammer 2.

In particular, bonding portions between each hat portion of the corrugated stringer 46 and the lower panel 43 are subject to tapping inspections in many cases. Accordingly, the target positions to be tapped with the hammer 2 are disposed along outlines of each hat portion of the corrugated stringer 46 as exemplified in FIG. 7.

On the other hand, the operator can tap the target positions on the lower panel 43 with the hammer 2 while grasping the relative positions of the target positions to the hat portion of the corrugated stringer 46 which is not actually visible. As a result, the operator can easily grasp whether a tapping sound generated when each target position has been tapped with the hammer 2 is an appropriate sound according to a position and structure of the corrugated stringer 46. This is similar not only to the corrugated stringer 46 but also to a reinforcement member, such as a stringer, a spar, a rib or a frame, having one of various cross sectional shapes, and the pad-up portion 49 around the access hole 48.

Note that, dimension lines, the coordinates of the inspection object O in the aircraft body coordinate system of the fixed wing aircraft 40 or the like, identification information of the fixed wing aircraft 40, identification information of a part to be subjected to tapping inspections, and information described in a work procedure manual may be displayed as drawing information of the inspection object O as exemplified in FIG. 7. Thereby, it is possible to more reliably prevent operator mistakes.

In order to superimpose a drawing, showing target positions of tapping inspections and outlines of an invisible portion inside an inspection portion, on the inspection portion as exemplified in FIG. 7, tapping positions and 2D design drawings of the inspection object O, including the corrugated stringer 46 and the lower panel 43, to be displayed on the display 4A of the HMD 4 must be three-dimensionally associated with a spatial position of the entire body, a structural elements, or a part of the fixed wing aircraft 40, and then stored in the design drawing information database 26. In addition, identification of a position of the fixed wing aircraft 40, identification of a position and an orientation of the HMD 4, and relative alignment between the fixed wing aircraft 40 and the HMD 4 must be performed in the tapping position guide part 27.

Examples of a method of easily identifying a position of the fixed wing aircraft 40 include a method of disposing the fixed wing aircraft 40 to be a target of tapping inspections at a predetermined stop position P as exemplified in FIG. 4. In that case, the stop position P of the fixed wing aircraft 40 can be notified to the tapping position guide part 27 by operating the input device 20.

As a matter of course, a position of the fixed wing aircraft 40 may be identified by placing the fixed wing aircraft 40 at a desired position and then photographing the fixed wing aircraft 40 with an optical camera, or using an IMU or a GPS receiver mounted on the fixed wing aircraft 40. In that case, the identified position of the fixed wing aircraft 40 may be notified to the tapping position guide part 27 via a network, such as wireless communication.

On the other hand, a position and an orientation of the HMD 4 can be detected by the position detection unit 4C of the HMD 4, which is normally included in the HMD 4 as long as the HMD 4 is for AR. The detected position and orientation of the HMD 4 can be wirelessly transferred to the tapping position guide part 27 in real time via the communication device 4B of the HMD 4 and the communication device 24 of the data processing unit 3.

Once the position of the fixed wing aircraft 40 as well as the position and orientation of the HMD 4 have been identified, relative alignment between the fixed wing aircraft 40 and the HMD 4 can be performed. When this alignment is completed, tapping positions and a 2D drawing stored in the design drawing information database 26 can be displayed on the display 4A of the HMD 4 according to the position and orientation of the HMD 4 so as to be superimposed on the actual inspection object O.

When the operator taps one of the target positions superimposed on the inspection object O with the hammer 2, a generated sound, a shock load and a tapped position are associated with each other, and then stored together with the time in the memory 8 attached to the hammer 2 as inspection record data of a tapping inspection. This inspection record data can be transferred to the data processing unit 3 and then stored in the data processing unit 3.

The inspection record acquisition part 28 has a function to acquire pieces of inspection record data of tapping inspections stored in the memory 8 attached to the hammer 2, and then store them in the inspection record database 29. Identification information of an operator, such as a mechanic or an inspector, may be added to inspection record data of a tapping inspection. In addition, a design drawing of the inspection object O can also be included in inspection record data so that the inspection record data can be displayed and superimposed on or linked to the design drawing of the inspection object O. Therefore, pieces of inspection record data of tapping inspections associated with the identification information of the inspection object O, such as an airframe or a part of the fixed wing aircraft 40, are accumulated in the inspection record database 29.

A design drawing of the inspection object O to be included in inspection record data can be acquired from the design drawing information database 26. Alternatively, a design drawing of the inspection object O may be given from the tapping position guide part 27 to the inspection record acquisition part 28. The hammer 2 may have the function to attach various pieces of information to inspection record data of a tapping inspection. That is, the hammer 2 may be provided with a user interface, such as a display and an input device, and used as a terminal for the data processing unit 3.

The reference information database 30 stores, as reference information, information representing tapping sounds when the inspection object O is a non-defective product. For example, the tapping sounds of the non-defective product can be acquired shortly after the inspection object O or a part of the inspection object O is produced, and then stored as waveform data themselves of sound waves or information, such as frequency analysis results, representing the characteristics of the waveform data of the sound waves after desired signal processing. Since the tapping sound of the non-defective product may differ depending on a tapping position, the information representing the tapping sound of the non-defective product is stored as the reference information for each tapping position.

When the ultrasonic sensor 6B is attached to the hammer 2 to collect an ultrasonic vibration as exemplified in FIG. 2, the reference information representing waveform data of a sound wave may be information representing waveform data of an ultrasonic wave.

The diagnosis/inspection result acquisition part 31 has a function to diagnose the inspection object O based on pieces of inspection record data of tapping inspections stored in the inspection record database 29 to determine the presence or absence of a defect, such as damage or a crack, and a function to store a determination result of the presence or absence of a defect in the diagnosis/inspection result database 32 as inspection result data. In addition, the diagnosis/ inspection result acquisition part 31 can also be provided with a function to create various reports based on inspection results of tapping inspections.

When the reference information is stored in the reference information database 30, the presence or absence of a defect can be determined by comparing a waveform of a tapping sound included in inspection record data of a tapping inspection stored in the inspection record database 29 with the reference information. Specifically, when there is a defect at a tapping position, a tapping sound becomes abnormal and the waveform of the sound wave changes. On the other hand, reference waveforms of sound waves stored as the reference information are waveforms when there is no defect. Therefore, when an index value, such as a square error or a cross-correlation value, representing an amount of divergence between the reference waveform and a waveform included in inspection record data exceeds an allowable range, it can be determined that there is a defect near the corresponding tapping position. It may be determined whether the frequency difference or ratio between the reference waveform and a waveform acquired as inspection record exceeds an allowable range.

As another example, waveforms of tapping sounds after signal processing may be compared with the reference information. In that case, it is realistic to use waveforms of tapping sounds from a non-defective product after the signal processing as the reference information. Specific examples of the signal processing include filter processing using an LPF (Low Pass Filter) and/or an HPF (High Pass Filter), smoothing processing, such as moving average processing, frequency analysis processing, such as Fourier transform or wavelet transform, and envelope detection processing.

Even when a piece of the reference information is not stored in the reference information database 30, the presence or absence of a defect can be determined by comparing waveforms, included in pieces of inspection record data acquired from tapping positions, with each other as long as tapping sounds having substantially the same characteristics are generated from the tapping positions tapped with the hammer 2 when there is no defect. Specifically, waveforms of sound waves acquired as pieces of inspection record data can be compared with each other, and then a tapping position from which a sound wave having a waveform different from another waveform beyond an allowable range has been generated can be determined as a position near which a defect has arisen. In this case also, waveforms after desired signal processing may be compared with each other.

In particular, aircraft parts having similar structures are often disposed regularly like the hat portions of the corrugated stringers 46 exemplified in FIG. 7. In such a case, not only waveforms included in pieces of inspection record data can be compared with each other as described above, but also pieces of the reference information to be stored in the reference information database 30 can be limited to a piece of the reference information for a representative tapping position. In other words, a piece of the reference information corresponding to a representative tapping position can be used as the reference information for other tapping positions.

In order to determine whether there is a defect, tapping positions actually tapped with the hammer 2 by an operator and shock loads may also be used in addition to waveforms of tapping sounds. That is, information included in inspection record data collected from the hammer 2 together with tapping sounds can be used for diagnosing the inspection object O. Thereby, diagnostic accuracy of tapping inspections can be improved.

Specifically, comparing a target position with an actual tapped position allows obtaining the error in the actual tapped position. Similarly, comparing an ideal shock load described in a work procedure manual or the like with an actually measured shock load allows obtaining the error in the shock load applied by an operator. Therefore, when at least one of the errors in the tapped position and the shock load exceeds an allowable range, it can be determined that a re-inspection or the like is required even when at least one waveform of a tapping sound has changed beyond an allowable range. That is, it is possible to avoid erroneous detection of a defect caused by an inappropriate inspection condition in a tapping inspection.

When waveforms of tapping sounds are collected by tapping a same inspection portion of the inspection object O, in which it has been confirmed that there is no defect, with the hammer 2 a plurality of times while gradually changing conditions, such as a tapping position and a shock load, it is possible to capture a waveform change of a tapping sound according to the conditions, such as a tapping position and a shock load. Therefore, it becomes possible not only to acquire a piece of the reference information for each condition, such as a tapping position or a shock load, but also to calibrate a tapping sound waveform included in a piece of the inspection record data according to the conditions, such as a tapping position and a shock load. As a result, inspection accuracy can be improved.

When determination results of the presence and absence of a defect at tapping positions of the inspection object O are obtained, the determination results can be stored in the diagnosis/inspection result database 32 as inspection result data of the inspection object O. The inspection result data may be data obtained by adding the determination results of the presence/absence of a defect to inspection record data. The inspection result data may also include whether conditions in tapping inspections, such as tapping positions and shock loads, were appropriate, i.e, whether the tapping inspections themselves were appropriate.

Therefore, pieces of inspection result data of tapping inspections indicating the presence/absence of a defect at inspection portions, associated with identification information of the inspection object O, such as an airframe or a part of the fixed wing aircraft 40, are accumulated in the diagnosis/inspection result database 32.

When inspection results of tapping inspections are sufficiently accumulated in the diagnosis/inspection result database 32, machine learning may be performed by AI (artificial intelligence) to diagnose the inspection object O based on inspection record data. Specifically, the diagnosis/inspection result acquisition part 31 may have a function to obtain a piece of inspection result data of the inspection object O using a DNN (deep neural network) whose input data is a piece of inspection record data including a tapping sound while output data is the piece of the inspection result data including the presence or absence of a defect. In this case, the machine learning of the DNN can be performed using teacher data including combinations of pieces of inspection record data stored in the inspection record database 29 and pieces of inspection result data stored in the diagnosis/inspection result database 32.

Inspection results of tapping inspections for the fixed wing aircraft 40 exemplified in FIG. 4 are mainly utilized as evidence for an airworthiness examination. Therefore, the diagnosis/inspection result acquisition unit 31 may have a function to create a report for an airworthiness examination.

Tapping Inspection Method

Next, a tapping inspection method of an inspection object O, such as the fixed wing aircraft 40, using the tapping inspection system 1 will be described.

Figure 8:
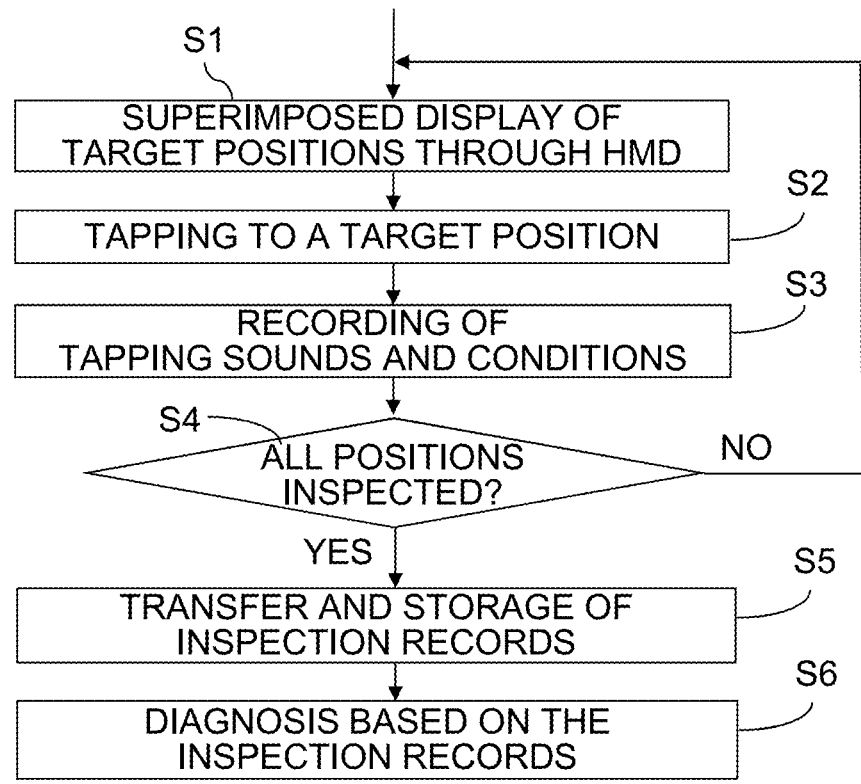
FIG. 8 is a flow chart showing an example of a flow of tapping inspections of the inspection object by the tapping inspection system shown in FIG. 1.

FIG. 8 is a flow chart showing an example of a flow of tapping inspections of the inspection object O by the tapping inspection system 1 shown in FIG. 1.

First, in step S1, target positions to be tapped with the hammer 2 are respectively superimposed on inspection portions of the inspection object O as guide information using the HMD 4. As a specific example, target positions to be tapped with the hammer 2 are superimposed on the lower panel 43 of the fixed wing aircraft 40 as exemplified in FIG. 5 through the HMD 4. As exemplified in FIG. 7, a design drawing on which contour lines representing internal structure of the inspection object O are drawn may also be superimposed and displayed on the inspection portions of the inspection object O, such as the lower panel 43 of the fixed wing aircraft 40, in addition to the target positions to be tapped with the hammer 2.

Then, in step S2, an operator performs tapping of one of the target positions. That is, one of the target positions is tapped with the hammer 2. Next, in step S3, tapping conditions, such as a position actually tapped with the hammer 2 and a shock load, are collected and recorded together with a tapping sound.

More specifically, the tapping sound is collected using the device 6 or the devices 6 consisting of at least one of the microphone 6A and the ultrasonic sensor 6B attached to the hammer 2 as exemplified in FIG. 2. Meanwhile, the shock load is detected by the strain sensor 7A embedded in the hammer head 2A while the tapped position is detected by the position detection unit 7B, such as an IMU, embedded in the hammer head 2A. The tapping sound, the shock load, and the tapped position are associated with the date and time, and then stored in the memory 8 as a piece of inspection record data.

The superimposed display of the guide information including the tapping target positions, the tapping to the target position, and the storage of a piece of the inspection record data in the memory 8 in step S1 to step S3 are repeated until it is determined in step S4 that pieces of the inspection record data for all the inspection portions have been obtained and stored. When it is determined in step S4 that the pieces of the inspection record data for all the inspection portions have been obtained and stored, the inspection record data are transferred to the data processing unit 3 and then stored in the inspection record database 29 in step S5. Alternatively, the determination in step S4 may be omitted while the pieces of the inspection record data may be sequentially transferred to the data processing unit 3.

Specifically, the inspection record data recorded in the memory 8 attached to the hammer 2 is wirelessly transferred to the data processing unit 3 having a configuration as exemplified in FIG. 3 via the communication device 9. Then, the inspection record acquisition part 28 of the data processing unit 3 acquires the inspection record data via the communication device 9 and stores the inspection record data in the inspection record database 29. When the inspection record data is stored in the inspection record database 29, the diagnosis/inspection result acquisition part 31 becomes possible to analyze the inspection record data.

Figure 9:
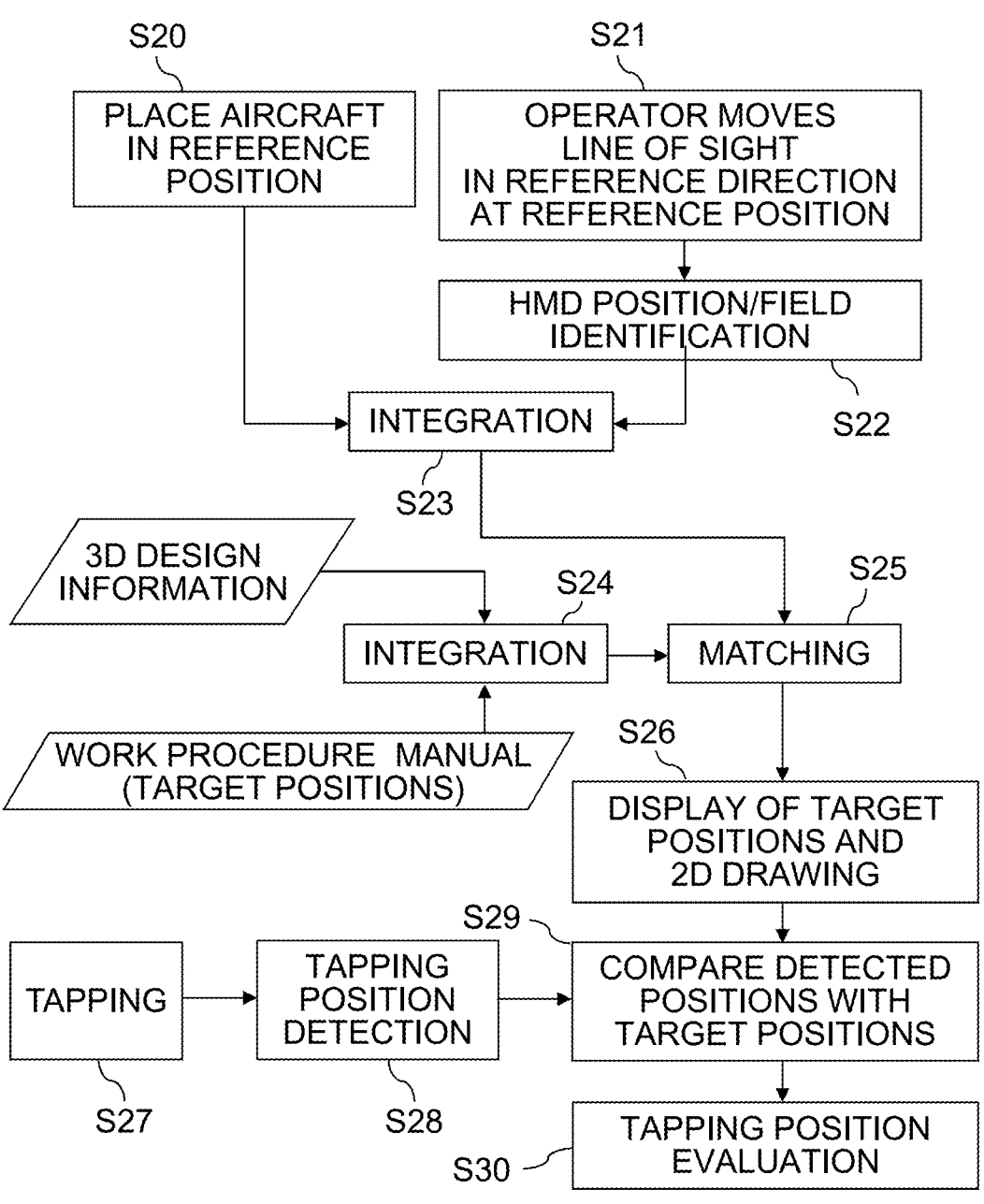
FIG. 9 is a flow chart showing an example of a flow of more detailed operation and processing for superimposing the guide information including the tapping target positions on the inspection object, and subsequently evaluating the actual tapping positions.

FIG. 9 is a flow chart showing an example of a flow of more detailed operation and processing for superimposing the guide information including the tapping target positions on the inspection object O, and subsequently evaluating the actual tapping positions.

The superimposed display of the guide information including the tapping target positions on the inspection object O in step S1 of FIG. 8 can be performed by the operation and processing in steps S20 to S26 of FIG. 9.

More specifically, in step S20, the inspection object O, such as the fixed wing aircraft 40, is placed at a reference position defined as the predetermined stop position P as exemplified in FIG. 4. Thereby, the position of the inspection object O is fixed. The stop position P of the inspection object O can be previously notified to the tapping position guide part 27 by operating the input device 20 or the like. Therefore, the position of the inspection object O can be identified in the tapping position guide part 27.

On the other hand, in step S21, when the operator wearing the HMD 4 stands at a reference position and looks at a reference position as exemplified in FIG. 1, the initial position and the initial orientation of the HMD 4 are fixed.

Therefore, a subsequent position and field of view of the HMD 4 can be identified by the position detection unit 4C in step S22. The position and the field of view of the HMD 4 identified by the position detection unit 4C of the HMD 4 are wirelessly transferred to the data processing unit 3 from the communication device 4B. Thereby, the position and the field of view of the HMD 4 can be identified in the tapping position guide part 27.

Next, in step S23, the tapping position guide part 27 integrates the position of the inspection object O with the position and the field of view of the HMD 4. Thereby, the relative positional relationship between the inspection object O and the HMD 4 is specified. That is, it becomes possible to express the position of the inspection object O, and the position and the field of view of the HMD 4 as coordinates and areas in a common coordinate space.

On the other hand, in step S24, the tapping position guide part 27 integrates 3D design information including 2D drawing information of the inspection object O acquired from the design drawing information database 26 with work procedure manual information defining the tapping target positions acquired from the design drawing information database 26. Thereby, the guide information including the tapping target positions superimposed on a 2D drawing can be created. Note that, the guide information may be previously stored in the design drawing information database 26 in the integrated state as described above.

Next, in step S25, the tapping position guide part 27 spatially matches the guide information, including the tapping target positions superimposed on the 2D drawing, with the position of the inspection object O, and the position and the field of view of the HMD 4. As a result, the coupling between the real space and the digital space is completed, which allows AR.

Next, in step S26, the tapping position guide part 27 wirelessly outputs the guide information to the display 4A of the HMD 4 in real time according to the latest field of view of the HMD 4. As a result, the tapping target positions and the 2D drawing of the inspection object O appear to overlap the actual inspection object O for the operator wearing the HMD 4.

Thereby, in step S27 of FIG. 9, the operator wearing the HMD 4 can perform tapping toward the target positions, as described in step S2 of FIG. 8. Then, in step S28, actual tapping positions are detected by the position detection unit 7B, such as an IMU, embedded in the hammer head 2A. The detected tapping positions are transferred to the data processing unit 3 as a part of the inspection record data, and then stored in the inspection record database 29, as described in step S3 of FIG. 8.

When the actual tapping positions are stored in the inspection record database 29, the diagnosis/inspection result acquisition part 31 can compare the actual tapping positions, detected by the position detection unit 7B of the hammer head 2A, with the tapping target positions respectively, in step S29. As a result, the actual tapping positions can be evaluated, in step S30. Specifically, when an actual tapping position has deviated from the corresponding target position beyond an allowable range, it can be determined that the actual tapping position is inappropriate.

Similarly, the diagnosis/inspection result acquisition part 31 can also compare the shock loads, applied to the inspection object O by tapping, with appropriate target loads respectively to determine appropriateness thereof. When both the tapping positions and the shock loads are appropriate, the diagnosis/inspection result acquisition part 31 can diagnose the inspection object O based on the inspection record data as shown in step S6 of FIG. 8.

Figure 10:
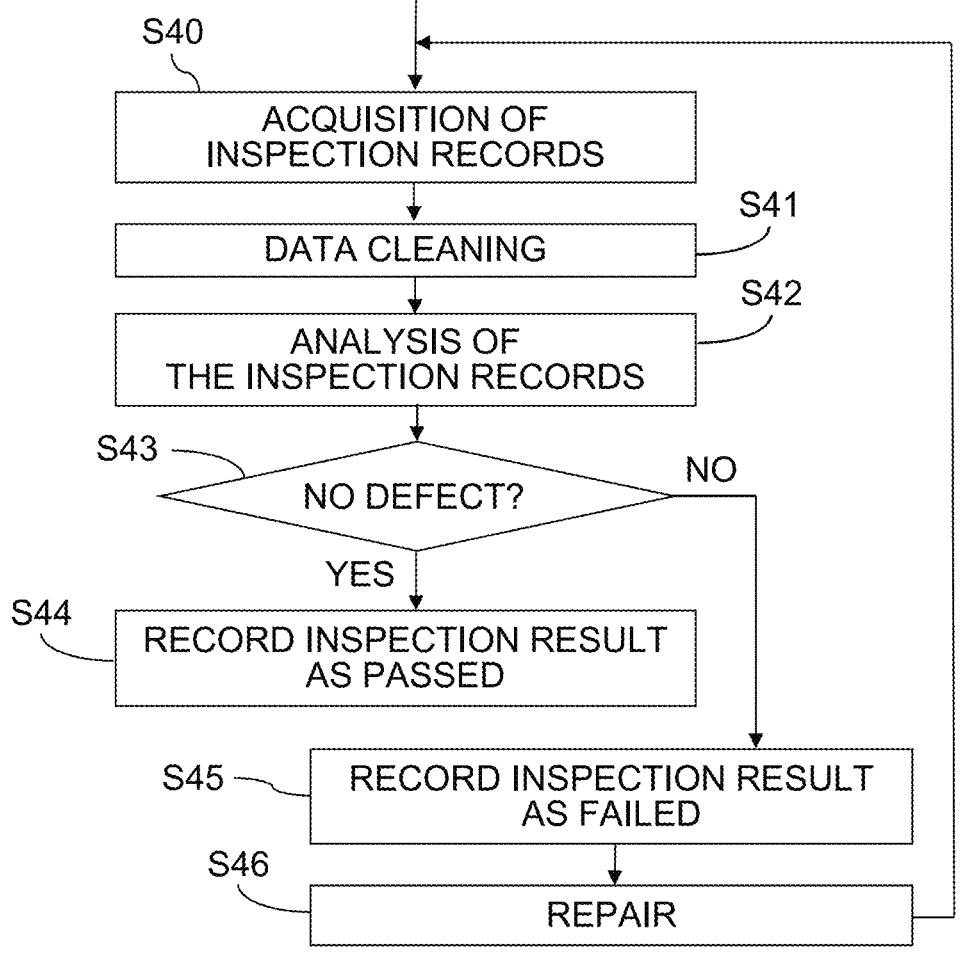
FIG. 10 is a flow chart showing an example of a flow of more detailed operation and processing for diagnosing the inspection object based on the tapping inspection record data.

FIG. 10 is a flow chart showing an example of a flow of more detailed operation and processing for diagnosing the inspection object O based on the tapping inspection record data.

For example, the diagnosis of the inspection object O shown in step S6 of FIG. 8 can be performed by processing in step S40 to step S45 of FIG. 10. More specifically, when new inspection record data is acquired in step S40 and then stored in the inspection record database 29, the diagnosis/inspection result acquisition part 31 reads the inspection record data with the latest date and time from the inspection record database 29. This corresponds to data cleaning of the inspection record data as shown in step S41.

Next, in step S42, the diagnosis/inspection result acquisition part 31 analyzes the latest inspection record data. More specifically, the presence or absence of an abnormal tapping sound is determined by comparing the waveforms of the tapping sounds or pieces of data representing characteristics of the waveforms included in the inspection record data with pieces of the reference information stored in the reference information database 30 respectively, and/or singular point detection by comparison between pieces of the inspection record data acquired from the tapping positions. Alternatively, it is also possible to acquire a determination result of the presence or absence of an abnormal tapping sound as output information from a DNN after machine learning.

When no abnormal tapping sound has been detected, the diagnosis/inspection result acquisition part 31 determines that the inspection object O has no defect, in the determination of step S43. In this case, the diagnosis/inspection result acquisition part 31 creates inspection result data indicating that the inspection result is acceptable, and then stores the created inspection result data in the diagnosis/inspection result database 32, in step S44.

On the other hand, when an abnormal tapping sound has been detected, the diagnosis/inspection result acquisition part 31 determines that the inspection object O has a defect, in the determination of step S43. In this case, the diagnosis/inspection result acquisition part 31 creates inspection result data including a tapping position where the abnormal tapping sound has been detected and indicating that the inspection result is not acceptable, and then stores the created inspection result data in the diagnosis/inspection result database 32, in step S45.

Accordingly, the inspection result data are stored in the diagnosis/inspection result database 32. In the inspection result data, identification information of an operator, such as a mechanic or an inspector, inspection date and time, information for specifying the inspection target O, a part and portions, tapping sounds, tapped positions, shock loads, acceptance/rejection determination results of tapping inspections, and appropriatenesses of tapping conditions, such as shock loads and tapped positions, can be recorded.

When the inspection result is unacceptable, the inspection object O can be repaired in the vicinity of the tapping position where the abnormal tapping sound has been detected, in step S46. Then, tapping inspections can be resumed for the repaired inspection object O to confirm that the repair has been properly performed.

Effects

As described above, the tapping inspection system 1 and the tapping inspection method allow collecting data including tapping sounds from the hand-held hammer 2 as well as superimposing and displaying target positions to be tapped by the hammer 2 on inspection portions of the inspection object O through the HMD 4.

Therefore, according to the tapping inspection system 1 and the tapping inspection method, an operator can easily grasp target positions which should be tapped with the hammer 2. In addition, superimposing a design drawing of the inspection object O on inspection portions allows tapping inspections while grasping a positional relationship between target positions to be tapped with the hammer 2 and an internal structure of the inspection object O. That is, even when the inspection object O has a complicated internal structure, it is possible to prompt an operator to tap appropriate positions with the hammer 2.

On the other hand, recording actual tapped positions and impact loads in addition to tapping sounds allows improving inspection accuracy. In particular, inspection record data and inspection result data can be stored in association with drawing information used for superimposed display on inspection portions. Therefore, it becomes easy to prepare a report for an airworthiness examination or the like. In addition, accumulated inspection record data and inspection result data can be utilized to change a design of an aircraft part and to design a new aircraft part.

Other Implementations

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, guide information including target positions to be tapped with the hammer 2 may be projected onto inspection portions of the inspection object O using a movable laser pointer or a projector although an example in which the HMD 4 is used to superimpose the guide information on inspection portions of the inspection object O has been described in the above-described implementation. In that case, it is realistic to place the inspection object O, such as the fixed wing aircraft 40, in a hanger that blocks sunlight, for tapping inspections. In this case, it is easier to identify a position of the laser pointer or the projector compared to the HMD 4 whose position and orientation can be freely changed together with an operator. Therefore, alignment between the guide information and the inspection object O is facilitated.

Further, a position of the hammer 2 may be identified with sensors, such as optical cameras or infrared sensors, although an example in which a position of the hammer 2 is identified by the position detection unit 7B built in the hammer head 2A has been described in the above-described implementation. In that case, it is necessary to dispose the sensors at appropriate positions so that target positions to be tapped by the hammer 2 and the hammer head 2A may fall within a field of view. When a position of the hammer 2 is identified with the sensors, attaching a marker to the hammer 2 is effective.

What is claimed is:

1. A tapping inspection system comprising:
a hand-held hammer for tapping an inspection portion;
a display configured to display a target position to be tapped with the hammer, the target position being superimposed on the inspection portion;
a microphone for collecting sound generated when the inspection portion is tapped with the hammer;
a position detector attached to a hammer head of the hand-held hammer and configured to detect, during tapping inspection, a position at a tip of the hammer head as an actual tapping position in the inspection portion tapped with the hammer; and
a storage configured to store an inspection record created by relating the sound collected by the microphone with the actual tapping position detected by the position detector.

2. The tapping inspection system according to claim 1, further comprising:
a strain sensor for measuring a shock load when the inspection portion is tapped with the hammer,
wherein the inspection record is created by further relating the sound collected by the microphone with the shock load measured by the strain sensor.

3. The tapping inspection system according to claim 2, further comprising:
electronic circuitry configured to obtain an inspection result of the inspection portion based on the related sound, position and shock load stored as the inspection record in the storage.

4. The tapping inspection system according to claim 3, wherein the display includes a head mounted display for augmented reality which further displays a drawing delineating a portion of internal structure inside the inspection portion that is not visible to an operator from outside the inspection portion, the drawing being further superimposed on the inspection portion.

5. A tapping inspection method comprising:
using the tapping inspection system according to claim 4 to inspect an aircraft, the method including:
displaying, on the head mounted display for augmented reality, the target position to be tapped with the hand-held hammer, the target position being superimposed on an inspection portion of the aircraft;
displaying, on the head mounted display for augmented reality, a drawing delineating a portion of internal structure inside the inspection portion that is not visible to an operator from outside the inspection portion, the drawing being further superimposed on the inspection portion;
collecting, with the microphone, sound generated when the inspection portion is tapped with the hand-held hammer;
detecting, with the position detector, an actual tapping position in the inspection portion tapped with the hand-held hammer, during tapping inspection;
measuring, with the strain sensor, a shock load when the inspection portion is tapped with the hand-held hammer;
storing, in the storage, an inspection record created by relating the collected sound with the detected position and the measured shock load; and
obtaining, with the electronic circuitry, an inspection result of the inspection portion based on the inspection record stored in the storage.

6. A tapping inspection method comprising:

using the tapping inspection system according to claim 3 to inspect an aircraft, the method including:

displaying, on the display, the target position to be tapped with the hand-held hammer, the target position being superimposed on an inspection portion of the aircraft;

collecting, with the microphone, sound generated when the inspection portion is tapped with the hand-held hammer;

detecting, with the position detector, an actual tapping position in the inspection portion tapped with the hand-held hammer, during tapping inspection;

measuring, with the strain sensor, a shock load when the inspection portion is tapped with the hand-held hammer;

storing, in the storage, an inspection record created by relating the collected sound with the detected position and the measured shock load; and obtaining, with the electronic circuitry, an inspection result of the inspection portion based on the inspection record stored in the storage.

7. The tapping inspection system according to claim 2, wherein the display includes a head mounted display for augmented reality which further displays a drawing delineating a portion of internal structure inside the inspection portion that is not visible to an operator from outside the inspection portion, the drawing being further superimposed on the inspection portion.

8. A tapping inspection method comprising:

using the tapping inspection system according to claim 7 to inspect an aircraft, the method including:

displaying, on the head mounted display for augmented reality, the target position to be tapped with the hand-held hammer, the target position being superimposed on an inspection portion of the aircraft;

displaying, on the head mounted display for augmented reality, a drawing delineating a portion of internal structure inside the inspection portion that is not visible to an operator from outside the inspection portion, the drawing being further superimposed on the inspection portion;

collecting, with the microphone, sound generated when the inspection portion is tapped with the hand-held hammer;

detecting, with the position detector, an actual tapping position in the inspection portion tapped with the hand-held hammer, during tapping inspection;

measuring, with the strain sensor, a shock load when the inspection portion is tapped with the hand-held hammer; and storing, in the storage, an inspection record created by relating the collected sound with the detected position and the measured shock load.

9. A tapping inspection method comprising:

using the tapping inspection system according to claim 2 to inspect an aircraft, the method including:

displaying, on the display, the target position to be tapped with the hand-held hammer, the target position being superimposed on an inspection portion of the aircraft;

collecting, with the microphone, sound generated when the inspection portion is tapped with the hand-held hammer;

detecting, with the position detector, an actual tapping position in the inspection portion tapped with the hand-held hammer, during tapping inspection;

measuring, with the strain sensor, a shock load when the inspection portion is tapped with the hand-held hammer; and storing, in the storage, an inspection record created by relating the collected sound with the detected position and the measured shock load.

10. The tapping inspection system according to claim 1, wherein the display includes a head mounted display for augmented reality which further displays a drawing delineating a portion of internal structure inside the inspection portion that is not visible to an operator from outside the inspection portion, the drawing being further superimposed on the inspection portion.

11. A tapping inspection method comprising:

using the tapping inspection system according to claim 10 to inspect an aircraft, the method including:

displaying, on the head mounted display for augmented reality, the target position to be tapped with the hand-held hammer, the target position being superimposed on an inspection portion of the aircraft;

displaying, on the head mounted display for augmented reality, a drawing delineating a portion of internal structure inside the inspection portion that is not visible to an operator from outside the inspection portion, the drawing being further superimposed on the inspection portion;

collecting, with the microphone, sound generated when the inspection portion is tapped with the hand-held hammer;

detecting, with the position detector, an actual tapping position in the inspection portion tapped with the hand-held hammer, during tapping inspection; and storing, in the storage, an inspection record created by relating the collected sound with the detected actual tapping position.

12. A tapping inspection method comprising:

using the tapping inspection system according to claim 1 to inspect an aircraft, the method including:

displaying, on the display, the target position to be tapped with the hand-held hammer, the target position being superimposed on an inspection portion of the aircraft;

collecting, with the microphone, sound generated when the inspection portion is tapped with the hand-held hammer;

detecting, with the position detector, an actual tapping position in the inspection portion tapped with the hand-held hammer, during tapping inspection; and storing, in the storage, an inspection record created by relating the collected sound with the detected actual tapping position.

13. The tapping inspection system according to claim 1, wherein the position detector is embedded in the hammer head.

14. The tapping inspection system according to claim 13, wherein the position detector includes an IMU (inertial measurement unit).

15. The tapping inspection system according to claim 1, wherein the microphone is attached to the hand-held hammer.

* * * * *